(12) United States Patent
Abma

(10) Patent No.: US 10,215,872 B2
(45) Date of Patent: Feb. 26, 2019

(54) CODING OF SIGNALS FOR EFFICIENT ACQUISITION

(71) Applicant: BP Corporation North America Inc., Houston, TX (US)

(72) Inventor: Raymond Lee Abma, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 106 days.

(21) Appl. No.: 15/348,598

(22) Filed: Nov. 10, 2016

(65) Prior Publication Data

US 2017/0176619 A1 Jun. 22, 2017

Related U.S. Application Data

(60) Provisional application No. 62/268,318, filed on Dec. 16, 2015.

(51) Int. Cl.
*G01V 1/00* (2006.01)
*G01V 1/38* (2006.01)

(52) U.S. Cl.
CPC ............ *G01V 1/3808* (2013.01); *G01V 1/005* (2013.01); *G01V 1/006* (2013.01); *G01V 1/3861* (2013.01); *G01V 2210/121* (2013.01); *G01V 2210/127* (2013.01); *G01V 2210/1293* (2013.01)

(58) Field of Classification Search
CPC .... G01V 1/3808; G01V 1/3861; G01V 1/006; G01V 2210/12; G01V 1/005; G01V 2210/127; G01V 2210/121; G01V 2210/1293

USPC .......................................................... 367/23
See application file for complete search history.

(56) References Cited

U.S. PATENT DOCUMENTS

| 4,295,213 | A | * | 10/1981 | Mifsud | .................. G01V 1/005 367/189 |
|---|---|---|---|---|---|
| 8,295,124 | B2 | | 10/2012 | Abma | |
| 8,837,255 | B2 | | 9/2014 | Ross | |
| 2004/0089499 | A1 | | 5/2004 | Smith | |
| 2012/0033525 | A1 | | 2/2012 | Abma et al. | |
| 2012/0147699 | A1 | | 6/2012 | Dellinger et al. | |
| 2012/0147701 | A1 | | 6/2012 | Ross et al. | |
| 2012/0314536 | A1 | * | 12/2012 | Bagaini | ................ G01V 1/3808 367/20 |
| 2015/0131409 | A1 | | 5/2015 | Abma et al. | |

(Continued)

FOREIGN PATENT DOCUMENTS

WO     2015011160     1/2015

OTHER PUBLICATIONS

International Patent Application No. PCT/US2016/061389 International Search Report and Written Opinion dated Feb. 1, 2017.

(Continued)

*Primary Examiner* — Ian J Lobo
(74) *Attorney, Agent, or Firm* — Robert Hsiao

(57) ABSTRACT

A method for use in marine seismic surveying includes: towing at least a portion of a marine seismic survey spread; imparting a composite swept seismic signal from the marine seismic survey spread, the composite swept seismic signal including a plurality of randomized subsweeps having different frequencies relative to one another and being emitted in parallel; and receiving a respective return for each of the subsweeps.

20 Claims, 15 Drawing Sheets

(56) References Cited

U.S. PATENT DOCUMENTS

2015/0204991 A1    7/2015   Abma et al.
2015/0260867 A1    9/2015   Abma et al.

OTHER PUBLICATIONS

Abma, R., et al., "Separating Simultaneous Sources by Inversion", 71st European Association of Geoscientists and Engineers Conference and Exhibition 2009: Amsterdam, The Netherlands, Jun. 8-11, 2009, Red Hook, NY: Curran, US, vol. 4, (Jun. 8, 2009), pp. 2642-2646.
Howe, D., et al., "B007 Independent Simultaneous Sweeping", BP Exploration, (Jul. 9, 2008), pp. 9-12.
Abma, R., et al., "Simultaneous shooting, today and tomorrow", (Jun. 4, 2012), pp. 4-7.

\* cited by examiner

CODING OF SIGNALS FOR EFFICIENT ACQUISITION

CROSS-REFERENCE TO RELATED APPLICATIONS

This application claims benefit of U.S. provisional patent application Ser. No. 62/268,318 filed Dec. 16, 2015, and entitled "Coding Of Marine Vibrator Signals For Efficient Acquisition" which is hereby incorporated herein by reference in its entirety.

FIELD OF THE INVENTION

The presently disclosed and claimed subject matter pertains to seismic surveying and, more particularly, to the operation and use of seismic sources in a seismic survey.

BACKGROUND

Seismic exploration today may generally be described as the technological search for hydrocarbon deposits in the Earth's subsurface through indirect observation of the subsurface. One part of seismic exploration is the acquisition of seismic data through what is known as a "seismic survey". In a seismic survey, seismic signals containing information regarding the subsurface are detected and recorded by seismic receivers. The information is embedded in the seismic signals by the interaction of the seismic signals with the geological features of the subsurface in known, characteristic ways. The information can then be used to reconstruct the subsurface's features. The recorded seismic signals are therefore representative of the tangible, real world subsurface and its features.

Seismic surveys are performed in a variety of natural environments and these natural environments lend themselves to variation in both technique and equipment. So, for example, seismic surveys may be classed as land surveys, marine surveys, and transition zone surveys because they are performed on land, in water, and both on land and in water, respectively. ("Marine" surveys may be performed in any kind of water, whether it be salty, fresh, or brackish.) A simple example of how these environments can affect the design and execution of a seismic survey is the fact that seismic receivers deployed in marine surveys have to deal with currents that are not found in land surveys. Marine seismic surveys therefore must account for these currents where land surveys do not. Other environmental differences yielding such variation abound.

Many seismic surveys employ what are known as "active" seismic sources. Active seismic sources generate the survey's seismic signals and impart them into the subsurface. Sometimes the signals are imparted directly into the subsurface from the ground's surface. In a marine survey, active seismic sources are sometimes positioned on the water's surface, and so the seismic signals travel through the water column before entering the ground instead of being imparted directly into the ground.

One common type of active source is known as a "vibrator" and is used in both land and marine surveys. The term "vibrator" comes from the fact that the energy is "vibratory" in the sense that it is generated through mechanical vibrations. The vibrations can be tailored as to the frequency and the duration of the vibratory seismic signal. (These vibrations are sometimes called "chirps", "sweeps" or "swept signals".) However, this is another example of how the technology varies depending on the environment as vibrators used in typical land surveys differ significantly from those used in marine surveys. For example, marine vibrators typically are moving during the survey, which constrains the sweep time lengths possible for a given spatial source interval. This is not true of vibrators in land surveys in which the vibrators are typically stationary in use. Also, vibrators used in land surveys typically constitute of from 1 to 6 mechanical devices whereas in marine surveys the vibrator typically comprises an array of somewhat smaller mechanical devices.

These and other technologies associated with seismic exploration continue to develop responsive to new technical and environmental challenges as well as pressures to reduce cost while increasing accuracy. Such innovation is welcomed by the industry in its efforts to improve the accuracy and efficiency of the seismic exploration process. Accordingly, while acceptable techniques for the conduct of marine seismic surveys are known to the art, the currently disclosed and claimed technique will eventually be well received by those in the art.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 6-FIG. 11 illustrate various aspects of the signal design and construction in one particular embodiment employing three subsweeps whose frequencies overlap, and in which:

FIG. 6 depicts the subsweeps needed to create the desired spectrum of the marine vibratory source in one particular embodiment in which the subsweeps have overlapping frequencies;

FIG. 7 illustrates the composite swept seismic signals constructed from the subsweeps of FIG. 6 used to create the desired spectrum of the source;

FIG. 8 depicts conventionally acquired seismic data with an impulsive source;

FIG. 9 depicts seismic data acquired with the composite swept seismic signals in FIG. 7 used randomly along the line;

FIG. 10 depicts reconstructed seismic data from the data in FIG. 9;

FIG. 11 depicts the difference between the reconstructed data of FIG. 10 and the conventionally acquired data of FIG. 8;

FIG. 12-FIG. 17 illustrate various aspects of the signal design and construction in a first particular embodiment that is a variant of that in FIG. 6-FIG. 11 in that it employs six subsweeps whose frequencies overlap, and in which:

FIG. 12 depicts the subsweeps needed to create the desired spectrum of the source;

FIG. 13 depicts the composite swept signals needed to create the desired spectrum of the source;

FIG. 14 depicts conventionally acquired seismic data with an impulsive source;

FIG. 15 depicts seismic data acquired with the sweeps in FIG. 13 used randomly along the line;

FIG. 16 depicts reconstructed seismic data from the data in FIG. 15; and

FIG. 17 depicts the difference between the reconstructed data and the conventionally acquired data.

FIG. 18-FIG. 24 illustrate various aspects of the signal design and construction in a third particular embodiment that is a variant of that in FIG. 6-FIG. 11 in that it takes advantage of low frequency and high frequency characteristics, and in which:

FIG. 18 depicts the subsweeps needed to create the desired spectrum of the source;

FIG. 19 depicts the composite swept signals with both low and high frequency signals;

FIG. 20 depicts the composite swept signals without the low frequency energy;

FIG. 21 depicts conventionally acquired seismic data with an impulsive source;

FIG. 22 depicts seismic data acquired with the sweeps in FIG. 19 and FIG. 20 used randomly along the line;

FIG. 23 depicts reconstructed seismic data from the data in FIG. 22; and

FIG. 24 depicts the difference between the reconstructed data and the conventionally acquired data.

FIG. 26-FIG. 31 illustrate various aspects of the signal design and construction in one particular embodiment employing three subsweeps whose frequencies do not overlap and instead contain gaps, and in which:

FIG. 26 depicts the subsweeps needed to create the desired spectrum of the marine vibratory source in one particular embodiment in which the subsweeps have gaps between frequencies;

FIG. 27 illustrates the composite swept seismic signals constructed from the subsweeps of FIG. 6 used to create the desired spectrum of the source;

FIG. 28 depicts conventionally acquired seismic data with an impulsive source;

FIG. 29 depicts seismic data acquired with the composite swept seismic signals in FIG. 7 used randomly along the line;

FIG. 30 depicts reconstructed seismic data from the data in FIG. 9; and

FIG. 31 depicts the difference between the reconstructed data of FIG. 10 and the conventionally acquired data of FIG. 8.

DESCRIPTION OF THE EMBODIMENTS

The presently disclosed seismic survey technique provides a technique by which a swept seismic signal is divided into "subsweeps", each "subsweep" including only a portion, or less than all, of the entire sweep. The subsweeps may then be imparted, or emitted the seismic signal into the environment in a directed manner, into the environment in parallel. In this context, "in parallel" means that the subsweeps are being imparted into the environment during the same source interval.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
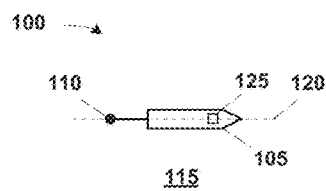
FIG. 1 is a plan, overhead view of a marine seismic survey apparatus such as may be used in the practice of the invention in some embodiments.
Figure 2A:
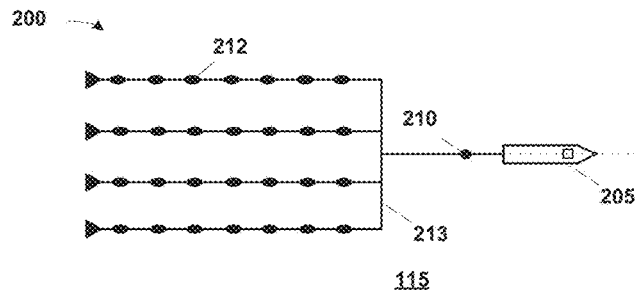
FIG. 2A-FIG. 2B illustrate selected embodiments alternative to that shown in FIG. 1 in a plan, overhead view and in a side view, respectively.
Figure 2B:
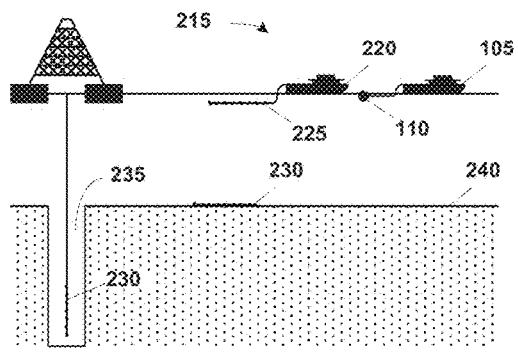

Turning now to FIG. 1, a marine seismic survey apparatus 100 such as may be used in the practice of the invention in some embodiments is shown in a plan, overhead view. The apparatus 100 comprises a tow vessel 105 towing a marine vibratory source 110 across the surface of the water 115. Those in the art having the benefit of this disclosure will appreciate that the apparatus 100 may vary according to implementation-specific details. For example, as shown in FIG. 2A, a particular marine seismic survey apparatus 200 may include a tow vessel 205 towing not only a source 210, but also an array 213 of receivers 212 (only one indicated). Alternatively, as shown in FIG. 2B, a marine seismic survey apparatus 215 may call for a second tow vessel 220 towing an array of receivers 225 or for an array 230 of receivers to be located in a wellbore 235 or on the seafloor 240. All such variations are within the scope of the subject matter claimed below.

In each of these embodiments, the tow vessel 105 and marine vibratory source 110 comprise a least a portion of the marine seismic survey spread. The marine seismic survey spread also includes the marine seismic receivers, such as the arrays 213, 225, 230 of receivers in 212 in FIG. 2A and FIG. 2B. Thus, in operation, the tow vessel 105 tows at least a portion of the marine seismic survey spread—i.e., the marine vibratory source 110.

Figure 3:
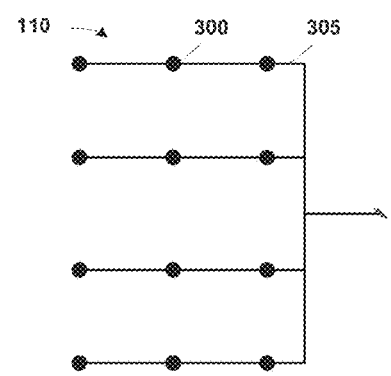
FIG. 3 is a plan, overhead view of a marine seismic vibratory source as may be used in the embodiment of FIG. 1.

One particular embodiment of the marine vibratory source 110 is better shown in in FIG. 3 in a plan, overhead view. In the illustrated embodiment, the marine vibratory source 110 comprises a plurality of marine vibrators 300 (only one indicated) disposed on a plurality of lines 305 (again, only one indicated). The marine vibrators 300, as a whole, constitute the array of the marine vibratory source 110. The marine vibrators 300 of each line 305 constitute a subarray of the overall array in this particular embodiment. The precise number of lines 305 and marine vibrators 300 is not material to the practice of the presently disclosed technique although certain numbers may be driven by implementation-specific considerations. The illustrated embodiment includes twelve marine vibrators 300 disposed on four lines, three marine vibrators 300 per line 305.

Those in the art having the benefit of this disclosure will appreciate that the marine vibratory source 110 in alternative embodiments may take on different arrangements of the marine vibrators 300. For example, in a more general form of an array, a hexagonal arrangement might have advantages but would be somewhat different from the traditional array in that the marine vibrators 300 would not be arranged in line. For a few large marine vibratory source 110, each of the marine vibrators 300 might be floated independently, allowing for more freedom in making the selected array arrangement. In yet another embodiment, the arrangement of seismic sources includes one or more low-frequency vibrators and one or more high-frequency sources, such as sparkers or airguns.

Returning to FIG. 1, in the illustrated embodiment, the tow vessel 105 tows the marine vibratory source 110 along a predetermined path 120. Those skilled in the art having the benefit of this disclosure will appreciate that the predetermined path 120 is conceptually represented herein. The predetermined path 120 will typically be what is referred to as a "sail line" or "source line" in the art that results from the survey design process in light of well-known considerations, such as coverage area, number and types of available vessels, etc. The survey design may be performed in accordance with conventional practice with respect to the definition and determination of the sail lines.

It is not necessary to the practice of the invention that the marine vibratory source 110 be towed along a predetermined path 120. Some embodiments may tow the marine vibratory source 110 randomly across the survey area. In some embodiments, the path on which the marine vibratory source 110 is towed is determined in the field and, perhaps, even on the fly. However, it is anticipated that most embodiments will include towing the marine vibratory source 110 along a predetermined path 120. As discussed herein, the term "random" means an arrangement or number that is generated in a random or pseudo-random manner where the numbers are designed to minimize regularities.

The marine seismic survey apparatus 100 furthermore may comprise a computing apparatus 125. Vessels such as the tow vessel 105 are typically equipped with one or more computing apparatuses suitable for implementing the presently disclosed technique. For example, a tow vessel will typically include a computerized navigational system for the tow vessel 105 and, sometimes, a computerized initiating control system for the marine vibratory source 110. These systems may be implemented in a single computing apparatus or in multiple apparatuses.

As is apparent from the description herein, some aspects of the presently disclosed technique are computer-implemented. Those aspects may include, for example, navigating the tow vessel 105, positioning the tow vessel 105 for initiating, and initiating the marine vibratory source 110. These functionalities may be separated into separate control systems—e.g., a navigational system and a initiating control system—or in a single control system—e.g., an operational control system. The software implementing these functionalities may be hosted and executed on a single computing apparatus or on multiple computing apparatuses. These aspects of the presently disclosed technique will be implementation specific and are not material to the practice of the invention.

Figure 4:
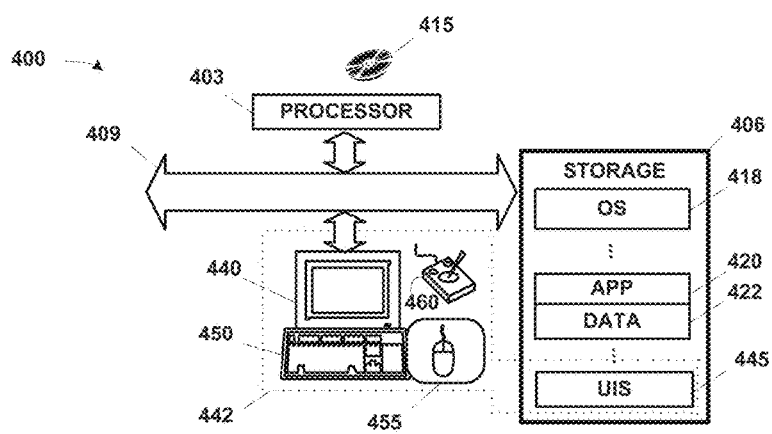
FIG. 4 is conceptualized depiction of one embodiment of a computing apparatus such as with which certain aspects of the presently disclosed technique may be implemented.

To that end, FIG. 4 illustrates selected aspects of the hardware and software architecture of a computing apparatus 400 such as may be used in some aspects of the presently disclosed technique. Those in the art having the benefit of this disclosure will appreciate that within this description much variation may be found across various embodiments. The computing apparatus 400 is therefore exemplary only and is employed to facilitate the disclosure of the subject matter disclosed below. Other embodiments may use alternative computing systems. The illustrated hardware and software architecture may be distributed across a computing apparatus comprised of a plurality of computing devices, for example. However, in the illustrated embodiment, the computing apparatus 400 includes a processor 403 communicating with storage 406 over a communication medium 409.

The processor 403 may be any suitable processor or processor set known to the art. Some types of processors will be preferred in various embodiments depending on familiar implementation-specific details. Factors such as processing power, speed, cost, and power consumption are commonly encountered in the design process and will be highly implementation specific. Because of their ubiquity in the art, such factors will be easily reconciled by those skilled in the art having the benefit of this disclosure. The processor 403 may theoretically be an electronic micro-controller, an electronic controller, an electronic microprocessor, an electronic processor set, or graphical processing units ("GPUs"). Some embodiments may even use some combination of these processor types.

In practice, however, the seismic data sets acquired in a survey typically are quite voluminous and their storage and handling can be computationally difficult. Timing constraints presented by a survey design similarly will also challenge computational resources. Some embodiments may also prove to be computationally intensive. Typical implementations for the processor 403 will therefore actually constitute multiple electronic processor sets spread across multiple computing apparatuses working in concert. These considerations affect the implementation of the storage 406 and the communication medium 409 similarly.

The storage 406 may include a hard disk and/or random access memory ("RAM"), neither of which are separately shown. It may also include removable storage such as an optical disk 415 or a thumb drive (not shown). These and any other suitable program storage medium known to the art may be used. However, implementation-specific design constraints may also influence the design of the storage 406 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID. As with the processor 403, these kinds of factors are commonplace in the design process and those skilled in the art having the benefit of this disclosure will be able to readily balance them in light of their implementation specific design constraints. The storage 406 may be distributed across multiple computing apparatuses as described above.

The storage 406 is encoded with a number of software components. These components include an operating system ("OS") 418 an application ("APP") 420, and one of more data structures including the acquired seismic data ("DATA") 422. The processor 403 operates under the control of the OS 418 and executes the computer-implemented aspects of the method over the communication medium 409. This may be initiated automatically, for example upon startup, or upon user command. User command may be directly through a user interface. To that end, the computing system 400 of the illustrated embodiment also employs some kind of a user interface 442 Including user interface software ("UIS") 445 and a display 440. It may also include peripheral input/output ("I/O") devices such as a keypad or keyboard 450, a mouse 455, or a joystick 460. These will be implementation-specific details that are not germane to the presently disclosed technique.

Furthermore, there is no requirement that the functionality of the computing system 400 described above be implemented as disclosed. For example, the functionality of the application 420 may be implemented in some other kind of software component, such as a daemon or utility. The functionality need not be aggregated into a single component and may be distributed across two or more components. Similarly, the data structure(s) may be implemented using any suitable data structure known to the art.

The implementation of the communications medium 409 will also vary with the implementation. If the computing system 400 is deployed on a single computing apparatus, the communications medium 409 may be, for example, the bus system of that single computing apparatus. Or, if the computing system 400 is implemented across a system of interfaced computing apparatuses, then the communications medium 409 may include a wired or wireless link between the computing apparatuses. Thus, the implementation of the communications medium 409 will be highly dependent on the particular embodiment in ways that will be apparent to those skilled in the art having the benefit of this disclosure.

Some portions of the detailed descriptions herein are presented in terms of a software implemented process involving symbolic representations of operations on data bits within memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. Again, the program storage medium is non-transitory. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation. For example, software run by optical means rather than electronic would be a suitable alternative.

Returning to FIG. 1, for the sake of clarity and ease of discussion, the computing apparatus 125 will be disclosed as possessing all of the computerized control for the practice of the invention. This accords with the disclosure of the application 420 of the computing apparatus 400 in FIG. 4. However, it is to be understood that alternative embodiments may distribute these functionalities across one or more software components across one or more computers.

Figure 5A:
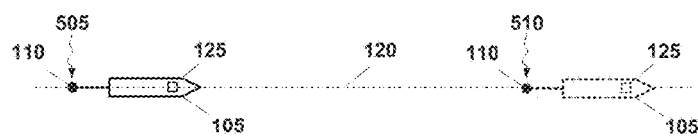
FIG. 5A-FIG. 5B conceptually illustrate the marine seismic survey apparatus of FIG. 1 in operation in one particular embodiment.
Figure 5B:
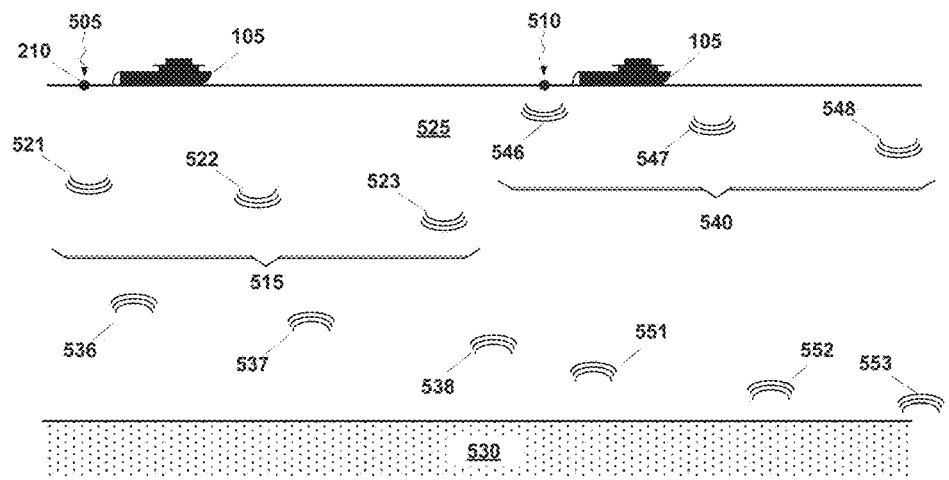

As shown in FIG. 5A and FIG. 5B, in operation, the tow vessel 105 sails under the control of the computing apparatus 125 and tows the marine vibratory source 110 from one position 505 to another position 510 over a geological formation of interest (not shown). Each point 505, 510 at which the marine vibratory source 110 is triggered, or "initiated", is typically known as a "source point". The period of time between each source is known as the "source interval".

At each source point 505, 510, the marine vibratory source 110 imparts a composite swept seismic signal 515, 540, respectively, from the marine seismic survey spread 103. The composite swept seismic signal 515 includes a plurality of randomized subsweeps 521, 522, 523. The number of subsweeps in any given embodiment will be predicated on implementation-specific considerations and the number three is representative only. Other embodiments may employ different numbers of subsweeps. The randomized subsweeps 521-523 each comprises different frequencies or ranges of frequencies, depending on the application, relative to one another and they are emitted in parallel. In this context, "in parallel" means within the same source interval. Considerations in the design and timing of the subsweeps 521-523 will be discussed further below.

The subsweeps 521-523 propagate through the water column 525 and into the subsurface 530. Upon entering the subsurface 530, the energy of the subsweeps 521-523 propagates there through until it is returned. The returns 536-538 are then received by the receivers of the marine seismic spread—e.g., the receivers of the arrays 225, 230, 235 in FIG. 2B.

The tow vessel 105 then tows the marine vibratory source 110 to the second position, source point 510, where the process repeats. The marine vibratory source 110 imparts a second composite swept seismic signal 540 comprised of a plurality of randomized subsweeps 546-548, the subsweeps 546-548 each comprising different frequencies or ranges of frequencies, depending on the application, relative to one another and being emitted in parallel. The subsweeps 546-548 propagate through the water column 525 into the subsurface 530 and returned to receivers where the receivers receive the returns 551-553. This process repeats until the survey is completed.

The design of the composite swept seismic signal with respect to the number of constituent subsweeps will be largely driven by the design of individual marine vibrators 300 of the marine vibratory source 110. The individual marine vibrators 300 typically will be designed for different performance parameters that will be appropriate for different subsweeps. For example, if one marine vibrator 300 is good over 2 to 30 Hz and another is good for 25 to 100 Hz, that would set the number of subsweeps to at least two. If there are different sets of marine vibrators 300 that work well for 2 to 30, 25 to 50, and 45 to 100 Hz, then there would be at least three subsweeps.

However, there are other constraints on the design—how long the marine vibratory source 110 should sweep and the amount of energy the composite swept signal should contain. With a marine vibrator 300 that works well for 25 to 100 Hz, one might still want two subarrays of that type of marine vibrator in each composite swept signal, one shaking at 25 to 60 Hz and another shaking at 50 to 100 Hz, in order to get the desired energy into the earth in the time it takes to move from one source point to another.

To further an understanding of this aspect of the subject matter claimed below, some exemplary embodiments of the composite swept seismic signal and subsweeps will now be discussed. In each of these embodiments, there are at least three subsweeps and differing numbers of composite swept signals constructed therefrom. However, as noted above, the number of subsweeps and their frequencies and energy content will be implementation-specific. Note that in each of the embodiments illustrated herein the data used for the illustration is synthetic data.

Figure 6:
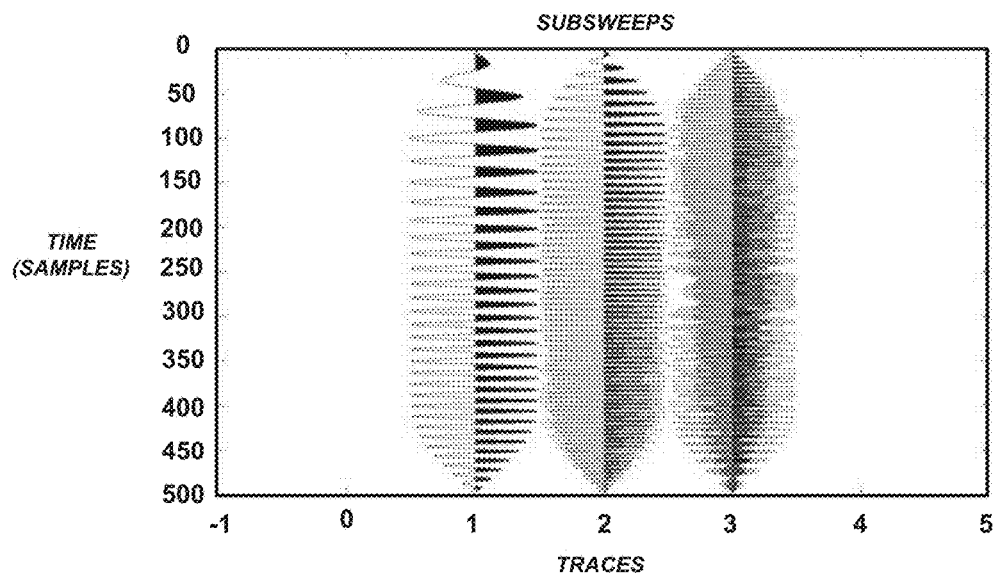
Figure 7:
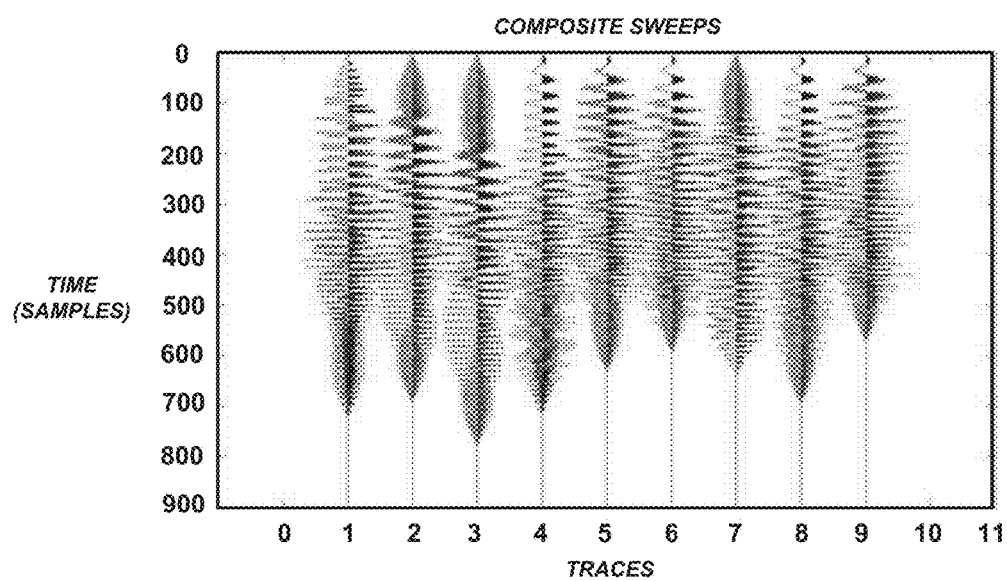

FIG. 6-FIG. 11 illustrate a first embodiment in which three sweeps, together, produce the full spectrum of the desired composite swept signal in this particular embodiment. The three sweeps are shown in FIG. 6 and, in this case, the frequencies of the subsweeps overlap. This overlap, if used with concurrent subsweeps, would produce imaging artifacts for the overlapping frequencies. To avoid these artifacts, the three subsweeps in FIG. 6 are combined to create nine composite swept signals seen in FIG. 7 that, if correlated, would create imaging artifacts, but different artifacts for each composite swept signal. Since the artifacts are not as coherent as the signal is expected to be, an inversion process that uses the coherence of the signal may be used to extract the desired signal.

Figure 8:
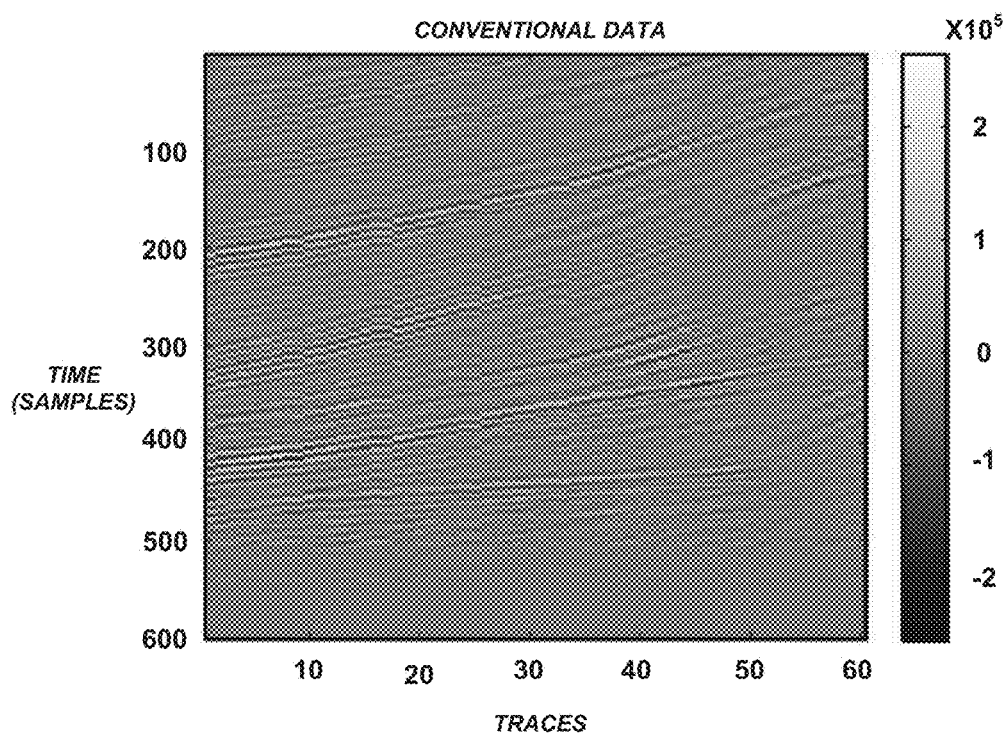
Figure 9:
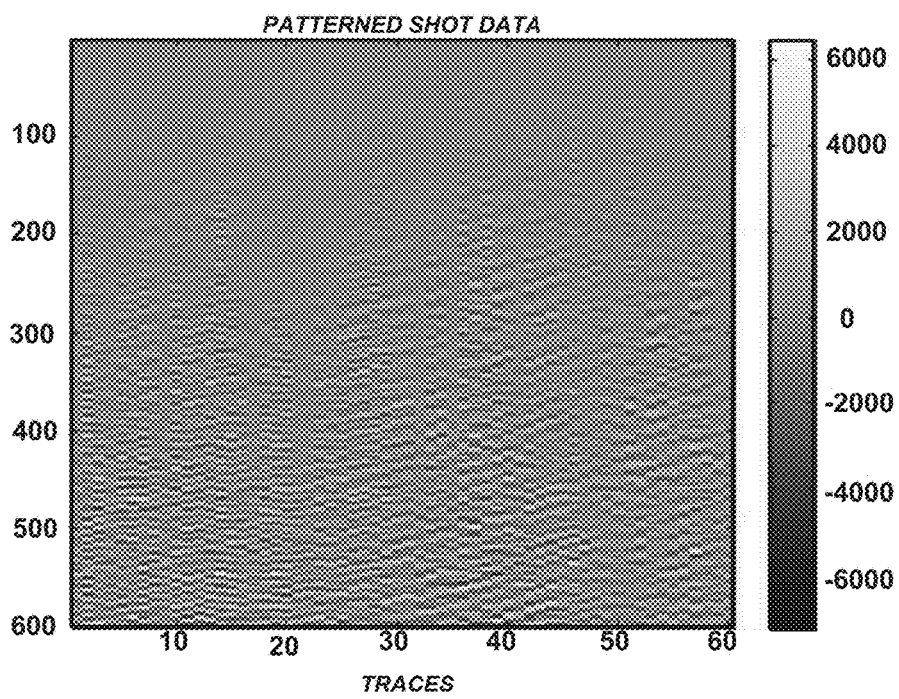
Figure 10:
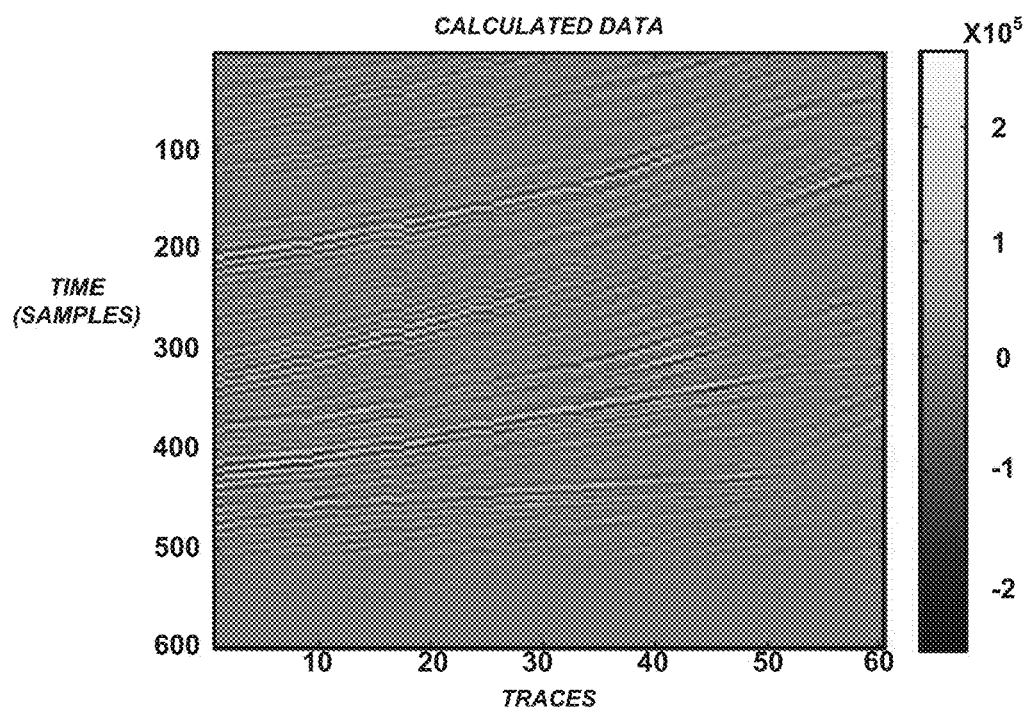
Figure 11:
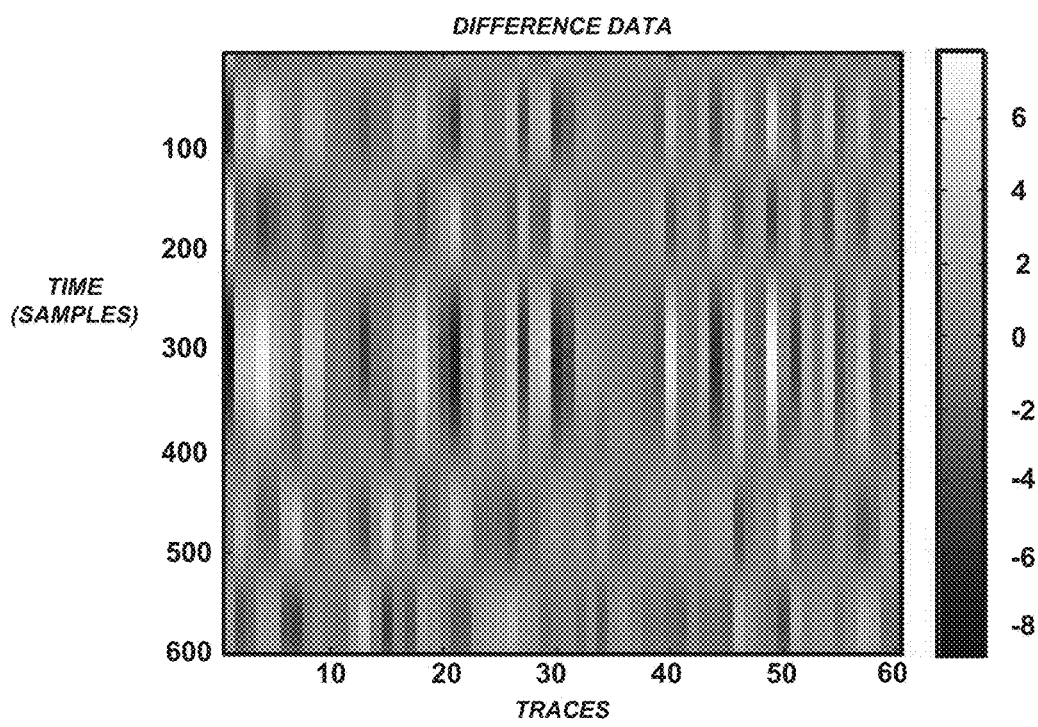

FIG. 8 shows the signal derived from a conventional impulsive source. FIG. 9 shows the result of using the sweeps in FIG. 7 randomly along the source line. FIG. 10 shows the result of using an inversion to reconstruct the conventional data from the data acquired with composite swept signals. Those in the art having the benefit of this disclosure will appreciate that the reconstruction is very accurate. The difference between the conventional results and the reconstructed results are show in FIG. 11. The difference is about 90 dB below the conventional signal amplitudes, making the difference effectively zero.

Figure 12:
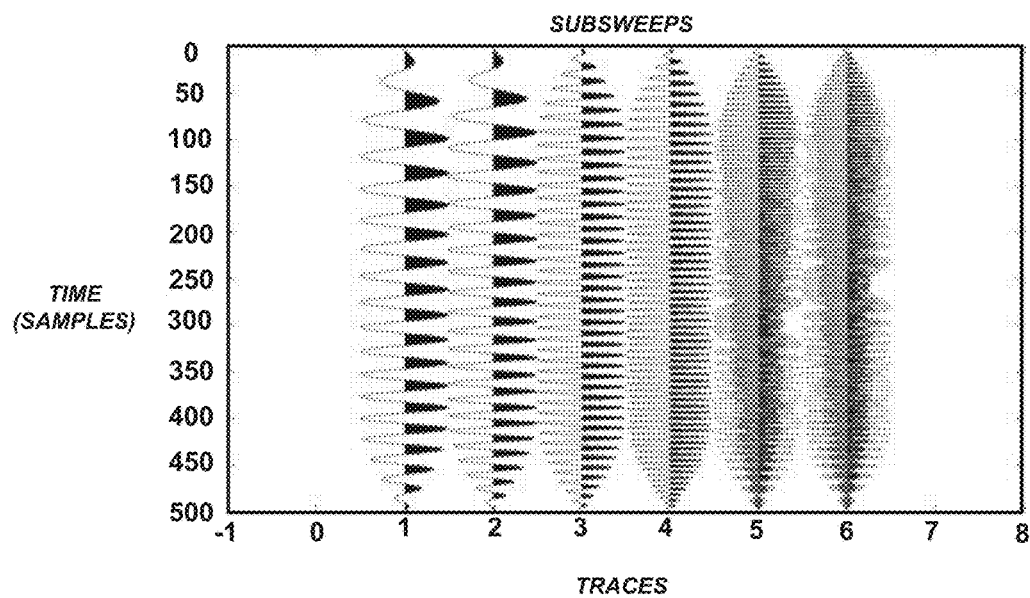
Figure 13:
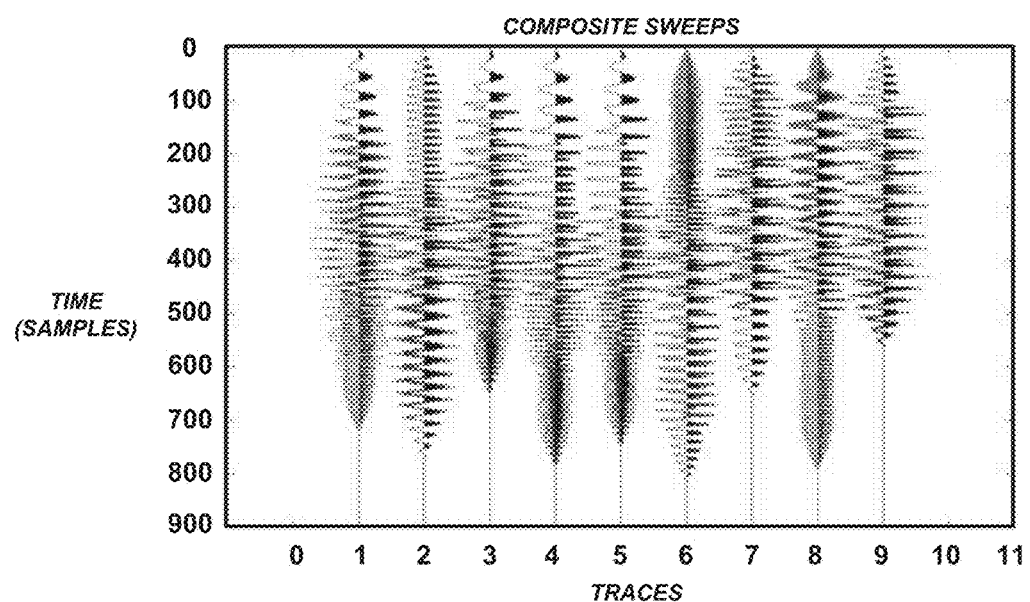

As noted above, different embodiment may use different number of subsweeps and/or composite swept signals. FIG. 12-FIG. 17 illustrates a second embodiment alternative to that in FIG. 6-FIG. 11. This particular embodiment varies from that in FIG. 6-FIG. 11 in that it employs six sweeps that, together, produce the full spectrum of the desired composite swept signal. The six sweeps are shown in FIG. 12 and, again, the frequencies of the subsweeps overlap. This overlap, if used with concurrent subsweeps, would produce imaging artifacts for the overlapping frequencies. To avoid these artifacts, the three sweeps in FIG. 12 are combined to create nine composite swept signals seen in FIG. 13 that, if correlated, would create artifacts, but different artifacts for each composite swept signal. Since the artifacts are not as coherent as the signal is expected to be, an inversion process that uses the coherence of the signal may be used to extract the desired signal.

Figure 14:
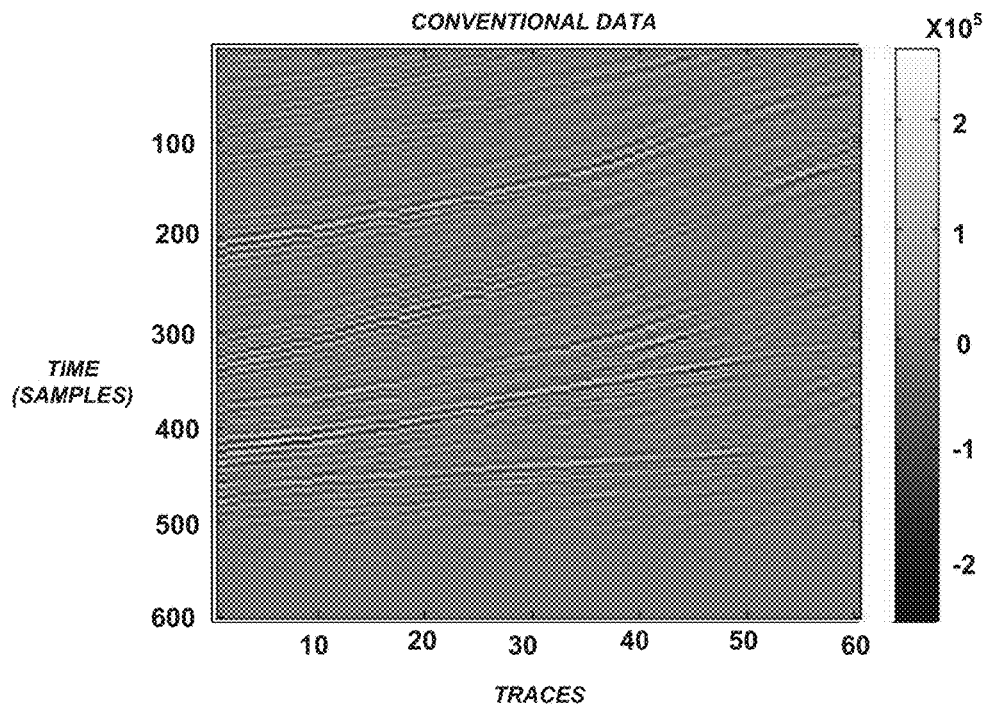
Figure 15:
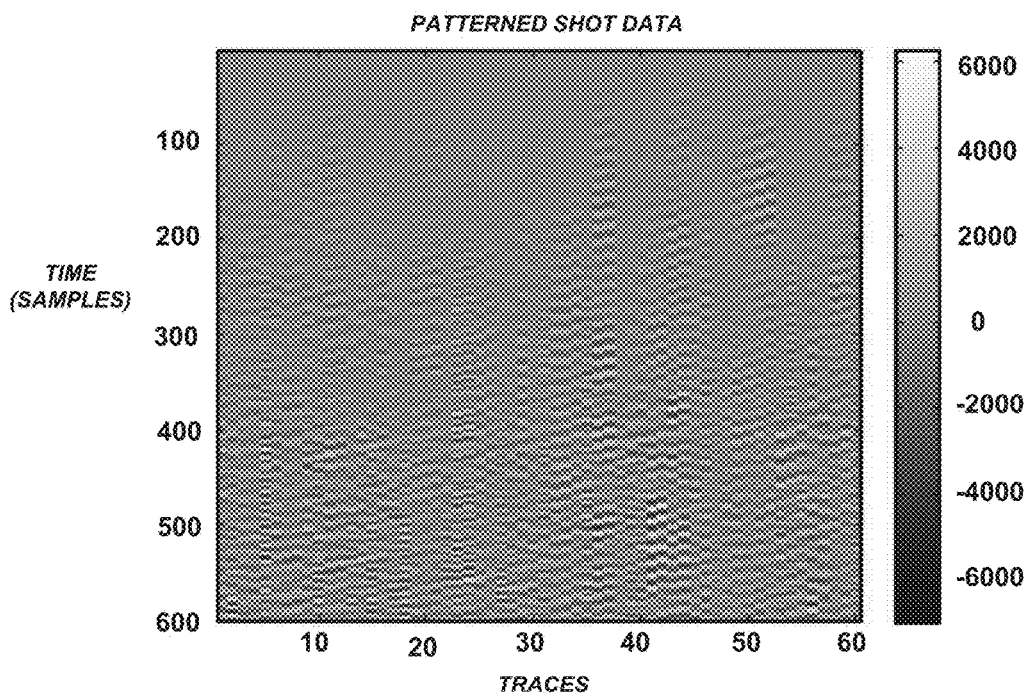
Figure 16:
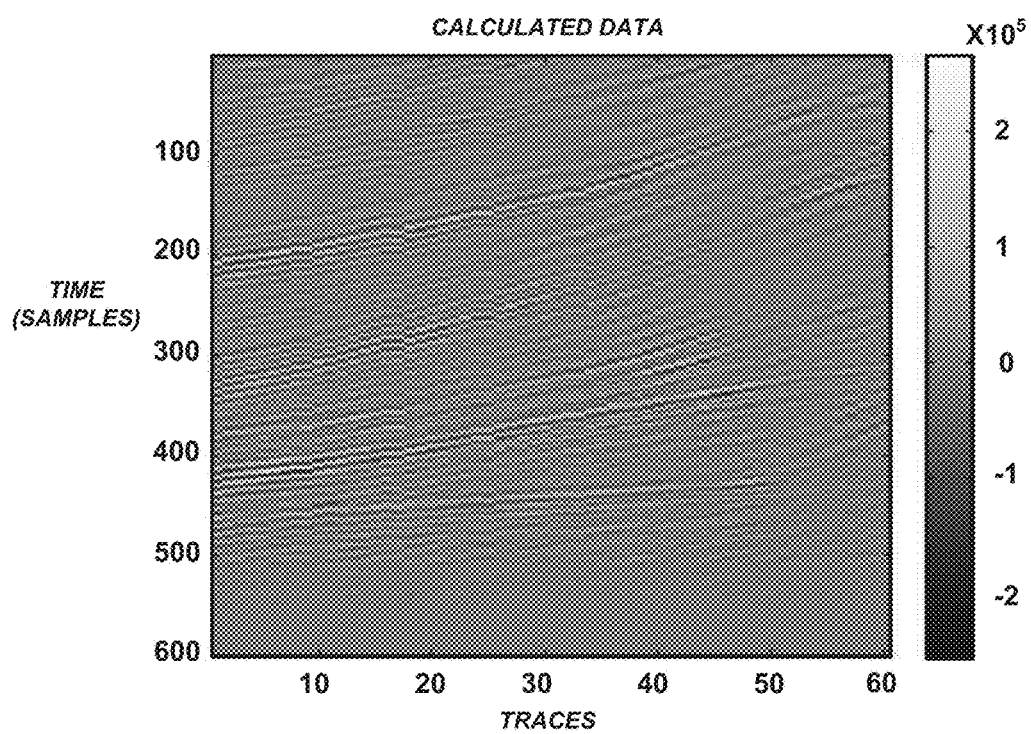
Figure 17:
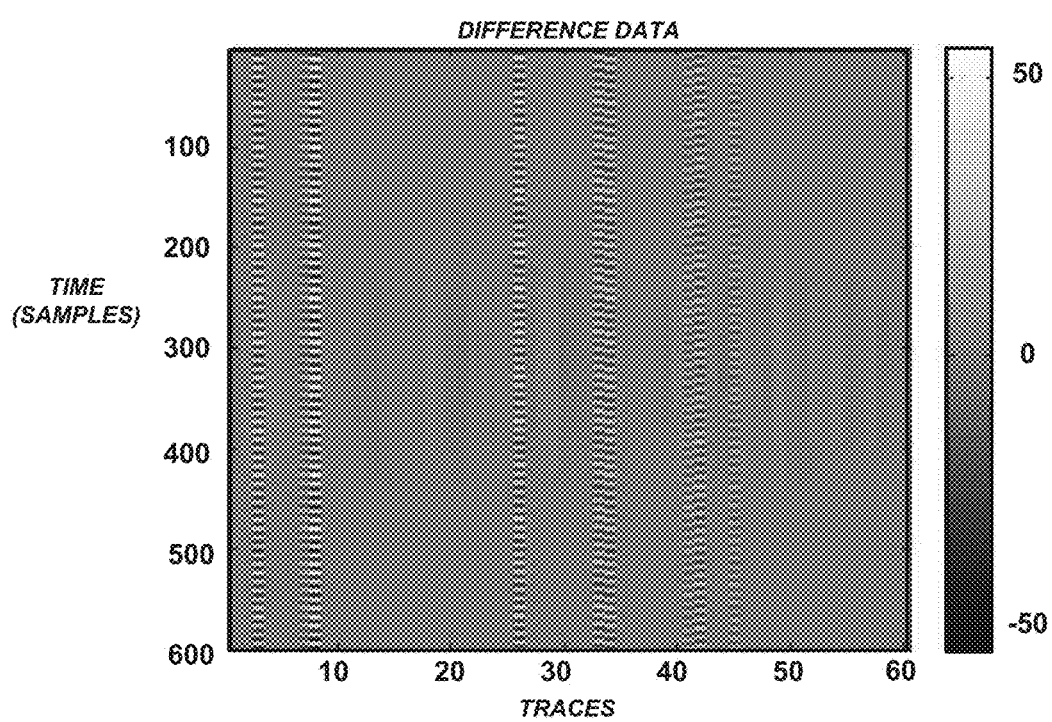

FIG. 14 shows the signal derived from a conventional impulsive source. FIG. 15 shows the result of using the sweeps in FIG. 13 randomly along the source line. FIG. 16 shows the result of using an inversion to reconstruct the conventional data from the data acquired with composite swept signals. Those in the art having the benefit of this disclosure will appreciate that the reconstruction is very accurate. The difference between the conventional results and the reconstructed results are show in FIG. 17. The difference is about 75 dB below the conventional signal amplitudes and, in some cases, may be ignored.

One aspect of creating source signals for seismic imaging is that lower frequency sweeps are more difficult to generate, but the low frequency signals may be acquired with a less dense grid of sources than higher frequencies. This means that sweeps with high frequencies may be done in a dense grid while sweeps with significant low frequencies are done only occasionally or spread out over a larger source area. Low frequency sweeps may be done at either regular intervals or at random intervals that have an average source interval that is greater than the source interval for the higher-frequency sweeps. The example here is done using sweeps that randomly drop out the low frequency components.

Figure 18:
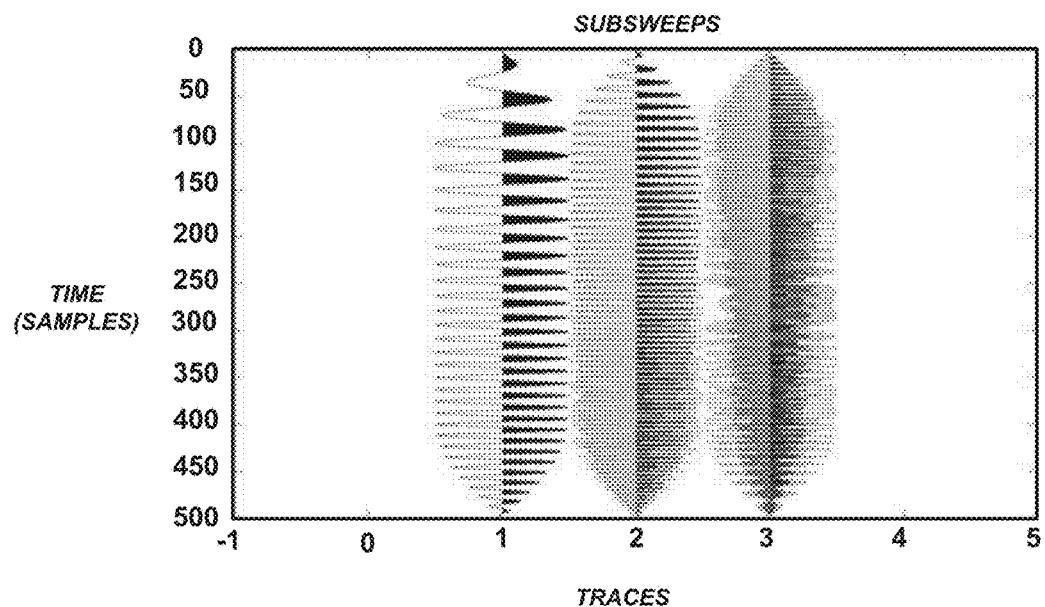
Figure 19:
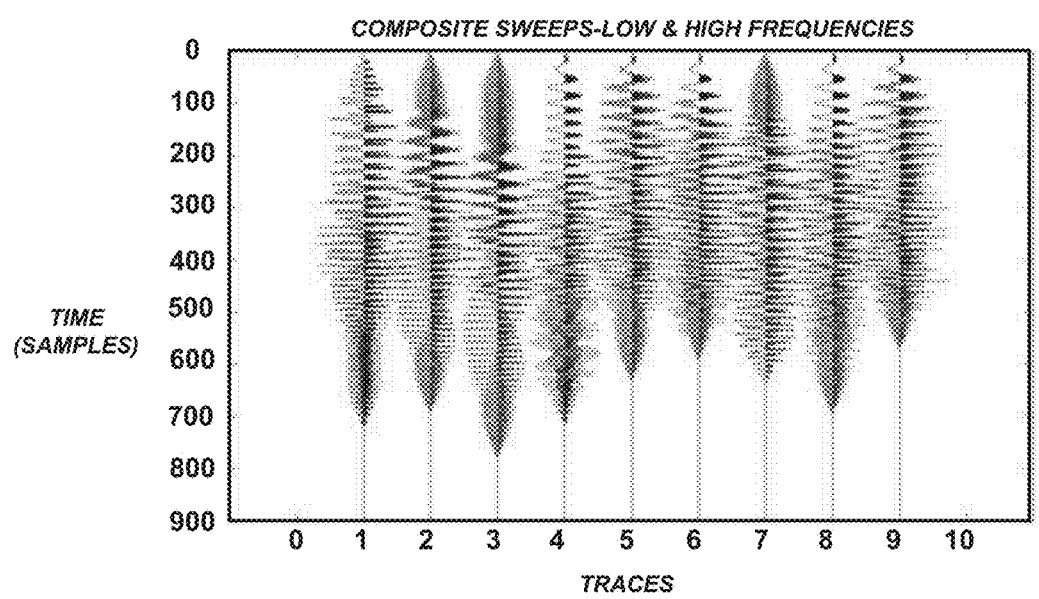
Figure 20:
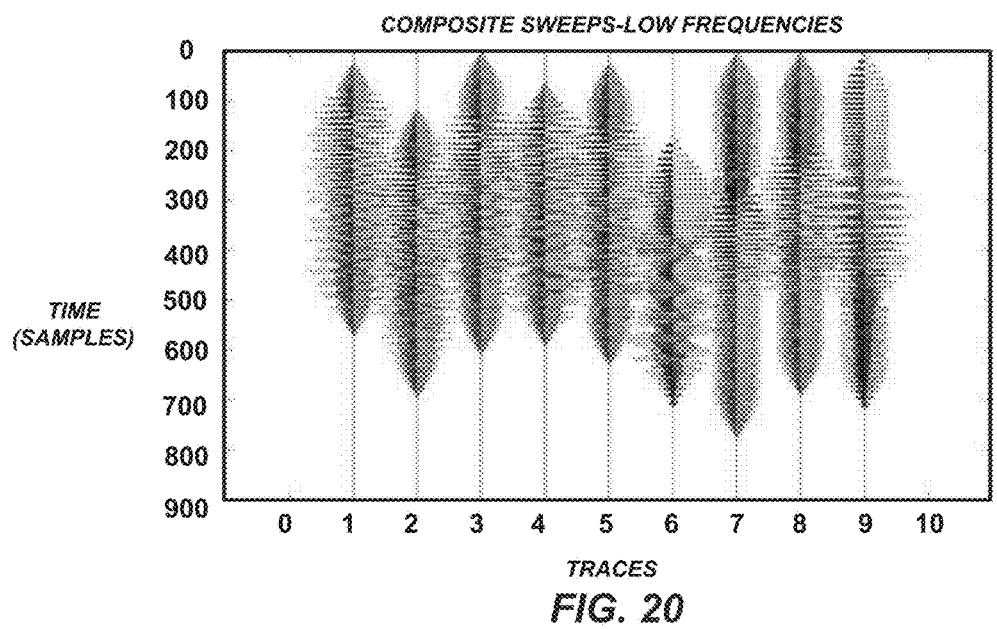
Figure 21:
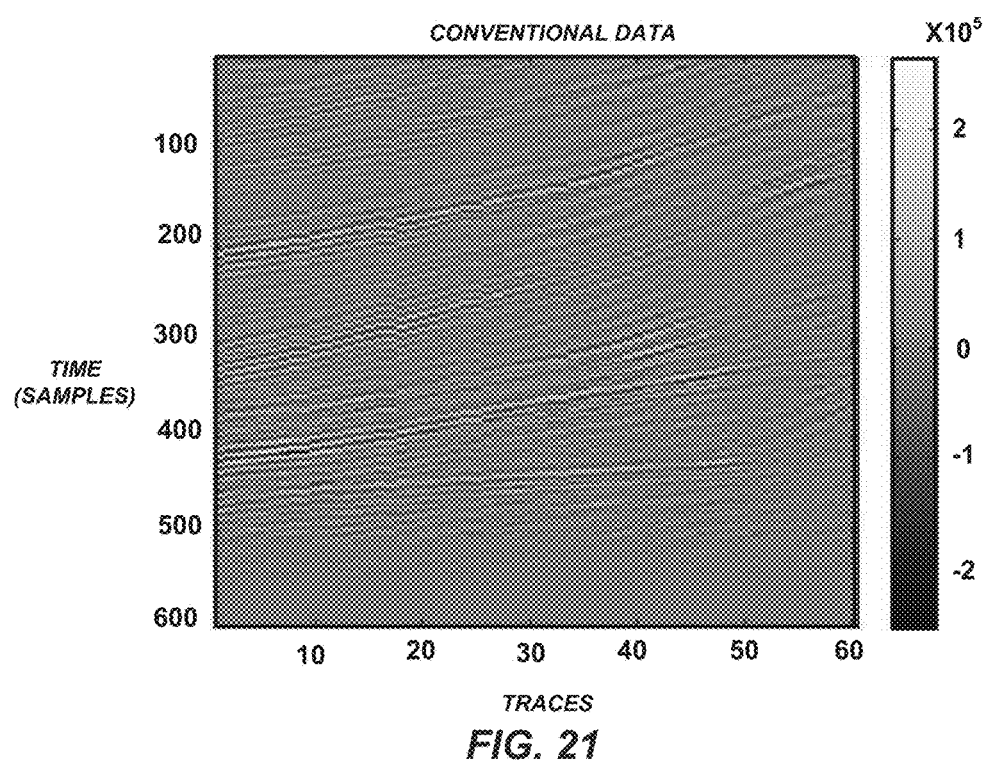
Figure 22:
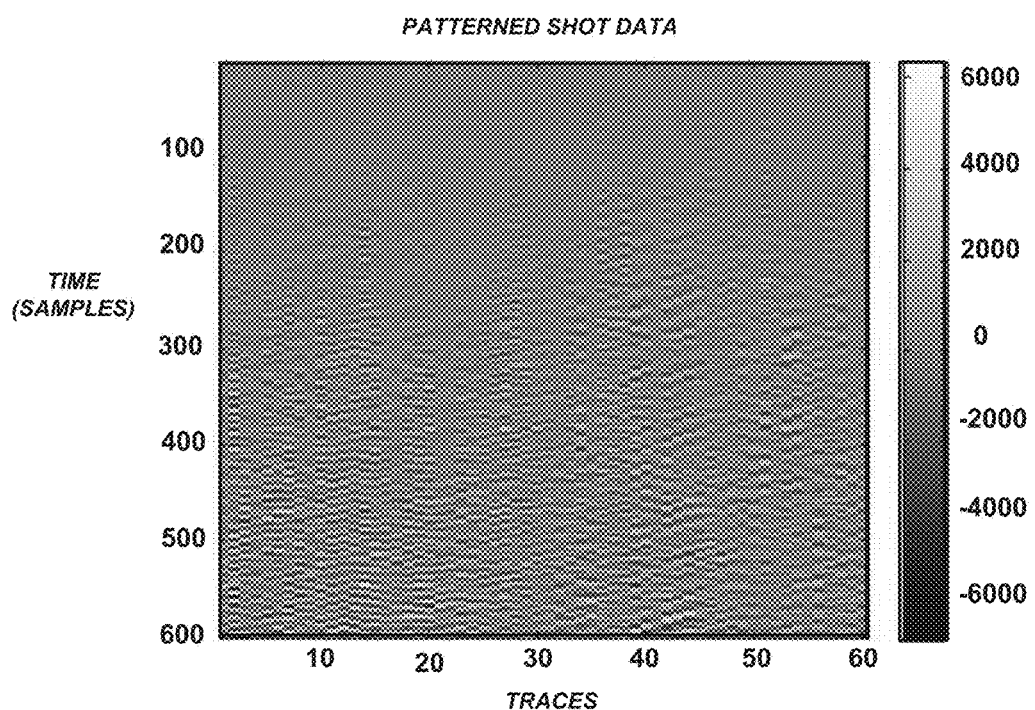
Figure 23:
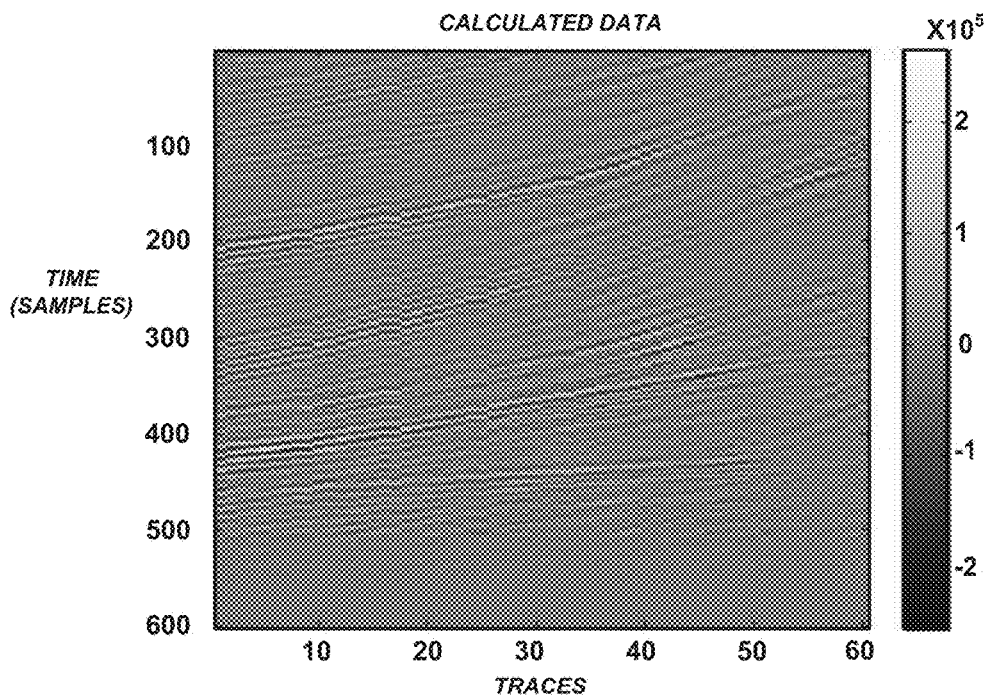
Figure 24:
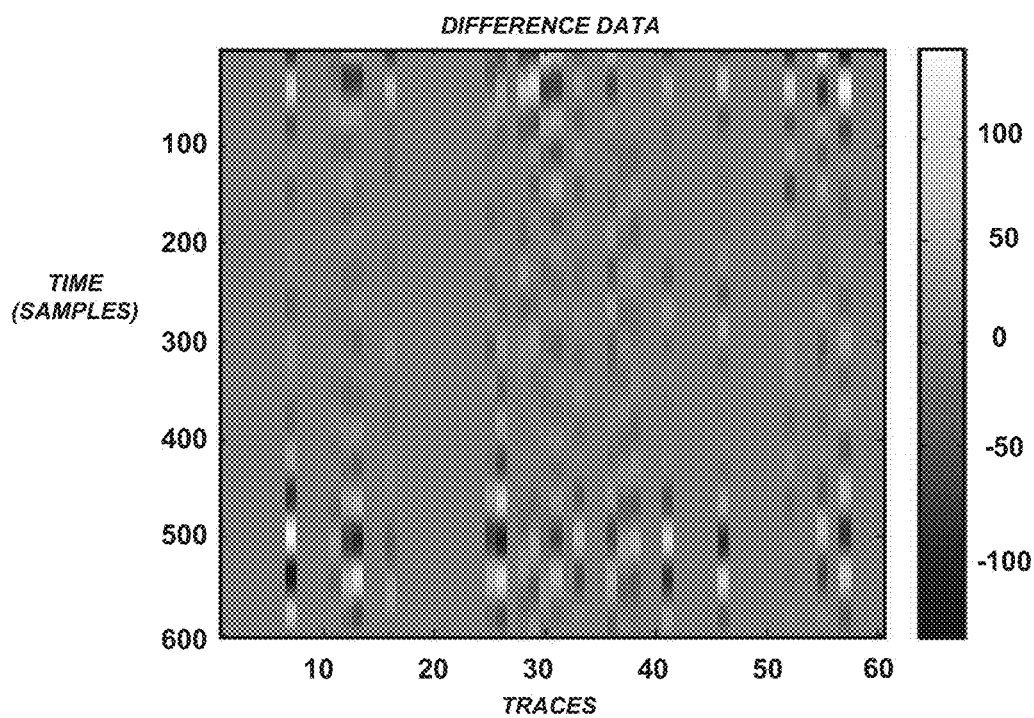

More particularly, FIG. 18 shows three sweeps, with the first sweep containing low-frequency energy, while the second and third sweeps containing higher frequency energy, that together create the desired spectrum of the source. FIG. 19 shows the composite swept signals generated from the three sub-sweeps in FIG. 18. FIG. 20 shows the composite swept signals generated from only the two higher-frequency sweeps from FIG. 18, i.e., without the low frequency energy. FIG. 21, FIG. 22, and FIG. 23 show the results from a conventional impulsive source, the data using the source sweeps in FIG. 19 and FIG. 20, and the results of the reconstruction of the conventional results from the data in FIG. 22. As can be seen in FIG. 24, the reconstruction quality is not as good as the previous results, but it is still accurate, and these results may be improved with more iterations of the inversion.

Figure 25:
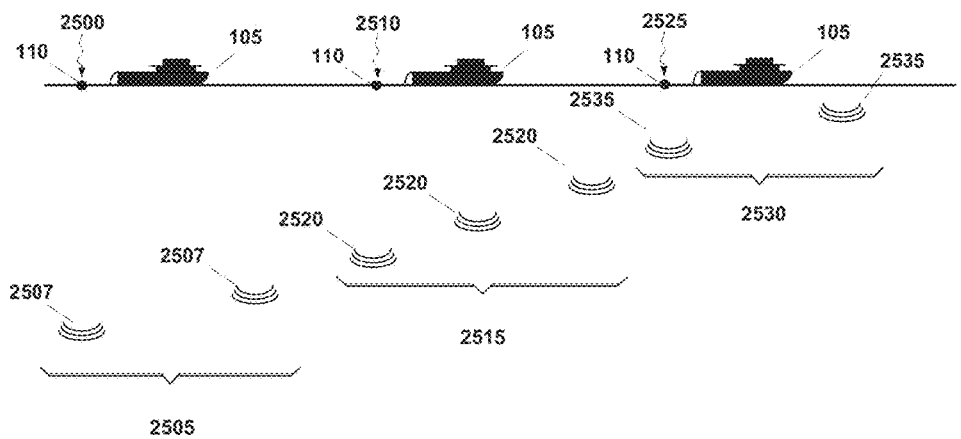
FIG. 25 illustrates one particular embodiment in which the number of subsweeps in composite swept signals is variable from one shot point to another.

As noted above, sweeps with high frequencies may be done in a dense grid while sweeps with significant low frequencies are done only occasionally. Low frequency sweeps may be done at either regular intervals or at random intervals that have an average source interval that is greater than the source interval for the higher-frequency sweeps. This variation means that the number of subsweeps in any given composite swept signal may vary within the same acquisition. Depending on the frequencies of the subsweeps and the densities of the receiver grids as discussed above, as shown in FIG. 25, a subsweep might only be imparted every other shot point, or perhaps ever third shot point. Alternatively, the low frequency subsweep may be extended over a longer surface interval. Thus, as an example, at shot point 2500, the composite swept signal 2505 comprises two subsweeps 2507; at shot point 2510, the composite swept signal 2515 comprises three subsweeps 2520; and, at shot point 2525, the composite swept signal 2530 comprises two subsweeps 2535 again. Those in the art having the benefit of this disclosure will understand the interrelationship between frequency, receiver density, and shot density and so will be able to implement this particular variation.

In the embodiments illustrated in FIG. 6-FIG. 24 the frequencies of the subsweeps overlap. However, this is not necessary to the practice of the claimed subject matter. The subsweeps that make up the composite swept signal do not need to have overlapping frequencies—there may instead be gaps in the frequency coverage. This may be done to reduce the possibility of imaging artifact events in the data from the frequencies in the overlapping sweeps.

While this means that a composite swept signal may have notches in its spectrum, these notches may be filled by an interpolation process incorporated into the inversion reconstruction, borrowing energy from nearby traces to fill in the notches. Suitable interpolation techniques are disclosed in U.S. Pat. Nos. 8,295,124 and 8,103,453. In particular, the Monte Carlo method discussed therein would produce a set of subsweep patterns that would be suitable for the vibrators and suitable for processing and separation.

As set forth in those references, the interpolation calculates a 3D Fast (or discrete) Fourier Transform $(k_x, k_y, k_z)$ on the seismic data set. It then computes the magnitude (e.g., a value times its complex conjugate) of the complex Fourier samples in the 3D transform. It forms a histogram of the magnitudes, divides the histogram into intervals of approximately equal energy, and selects thresholds using histogram boundaries. It then uses the thresholds in the "projection onto convex sets" interpolation process to estimate missing seismic data. Note that while this particular embodiment employs a Fast Fourier Transform technique, other embodiments may use other techniques. Suitable alternative techniques include, among others, Radon transforms, wavelet transforms, and other transforms that create sparse representations of the signal or noise.

This use of interpolation also implies that the acquisition provides adequate spatial sampling to accommodate the interpolation technique being used. While the need to interpolate the missing energy increases the computational cost of the inversion, the accuracy of the inversion is comparable to that of the previous example where no notches occurred in the spectra of the sources. Note, furthermore, that the applicable interpolation techniques are not limited to those disclose in the cited references.

There should also be an element of randomness in the start times of the subsweeps in any given composite swept signal signals. The design of the composite swept signal will depend on how many subsweeps are desired, as noted above. The randomness imparts a degree of incoherence that permits the inversion to separate the signals upon processing.

In the embodiments set forth in FIG. 6-FIG. 24, the times that the subsweeps started within the composite swept signal was set by a random number generator. Some embodiments may use this approach provided that checks ensure that there are no subsweep start times that are too similar from one composite swept signal to another. Other embodiments might use design criteria for randomness such as those described in U.S. Patent Publication 2015/0131409. The presently disclosed technique may actually be adopted for use in the survey disclosed in U.S. Patent Publication 2015/0131409. This publication uses what is essentially a Monte-Carlo method of generating shooting patterns in a marine seismic survey. In these embodiments, one can adopt all the constraints they desire into a Monte-Carlo scheme, generate a lot of composite swept signals, and discard the composite swept signals that do not fit the design criteria. Note, however, that each constraint increases demand for computing power. The use of random sequences is not necessarily the only approach to designing subsweeps. Other methods that reduce correlations between the signals generated by the different patterns may also be used.

One useful characteristic of this approach is that it provides the survey designer the opportunity to take advantage of the make-up of the marine vibratory source. Those in the art will appreciate that the marine vibratory source 110, shown in FIG. 1 and FIG. 3, not only comprises a plurality of marine vibrators 300, but that these marine vibrators 300 will typically also be of different design. These different designs can manifest characteristics that may be advantageously affect the survey design.

For example, some may more efficiently impart signals while others may more efficiently impart high frequencies. If the identity of the marine vibrators 300 is known, the design of the survey can then tailor the subsweeps and composite swept signals to the various marine vibrators 300. Thus, the marine vibrators 300 designed to impart low frequency signals can be assigned subsweeps that are richer in lower frequencies. Marine vibrators 300 designed to impart high frequency signals can likewise be assigned subsweeps that are richer in higher frequencies.

For another example, in conventional practice, all the marine vibrators 300 operate when the marine vibratory source 110 is triggered, or "initiated". The purpose of this timing is to impart energy into the environment in the form of the swept seismic signal. In certain embodiments of the present invention, where multiple marine vibrators 300 are assigned the same subsweep, then those marine vibrators 300 can similarly be initiated at the same time for the same reason.

Also, in some embodiments, marine vibrators 300 assigned the same subsweep may be positioned within the marine vibratory source 110 so that they are clustered within the array, say segregated into contiguous positions. Or, in some other embodiments, the marine vibrators 300 assigned the same subsweep may be distributed throughout the array. In this respect, what is desired is that the marine vibratory source 110 exhibit an array effect. For example, it will typically be desirable that the subarray of marine vibrators 300 be somewhat symmetrical to avoid directionality in the signal.

In one particular embodiment, more than one marine vibratory source 110 may be used concurrently during the acquisition. U.S. Pat. No. 8,295,124 describes a technique referred to as "independent simultaneous source" shooting, also known by the mark ISS®. The hallmark of this technique is the use of multiple sources that are each initiating at the same time (i.e., "simultaneously") essentially without regard to the times at which the other is initiating (i.e., "independently"). The trigger times, however, are intentionally derived so that the trigger times of one source are random with respect to the trigger times of the other source. This imparts the non-coherent randomness to the acquired data that permits the inversion process to separate the signals. Other embodiments may also employ the "popcorn" acquisition described in U.S. Patent Publication 2015/0131409, U.S. Patent Publication U.S. 2012/0147701, U.S. Pat. Nos. 8,295,124, and 8,103,453. All of these references are commonly assigned herewith.

The popcorn acquisition provides a system and method for separating multiple seismic sources acquired with recording of the reflectors overlapped in time. In brief, this technique utilizes an inversion-type method to separate seismic recordings that contain multiple seismic sources (e.g., Vibroseis®, air guns, etc.) that contain overlapping reflectors. The sources can be be initiated (e.g., fired) at random times while multiple receivers are being recorded. These random delays tend to make the interference between different sources incoherent while the reflections associated with the same source create coherent events. The separation will preferably be done with a numerical inversion process that utilizes the sweeps for each shot, the start times of each shot, and the coherence of reflection events between nearby shots.

In one the embodiments disclosed therein, the system of equations that is to be inverted may be described as $d=\Gamma S\, m$, where d is a matrix representation of the recorded seismic data, m is the set of separated reflection signals, S is the matrix or operator that describes the similarity between nearby shots, and $\Gamma$ is a matrix that defines the blending or mixing of the individual sources. The entries in the matrix S (or the operator that defines S) can be selected by any method that constrains the events in nearby shots to be similar or coherent in some sense. In some preferred embodiments the entries of S will be selected according to an algorithm that tends to attenuate signals between nearby shots. The matrix S may be designed to enhance coherence in several dimensions, depending on the geometry of the acquisition.

However, the presently claimed subject matter is not limited to this type of acquisition. Other suitable acquisition techniques may become apparent to those skilled in the art having the benefit of this disclosure and any such suitable technique may be employed.

The seismic data may be processed in accordance with the principles disclosed in U.S. Pat. No. 8,295,124, U.S. Patent Publication 2015/0131409 and U.S. Patent Publication U.S. 2012/0147701—all commonly assigned herewith—once it is acquired. In embodiments in which the subsweeps overlap in frequency, the overlaps are randomized as described above. Similarly, in embodiments in which there are gaps between the frequencies of the sweeps, the gaps are randomized. "Randomized" in this context means that the trigger times for imparting the assigned subsweep are managed to ensure that that the subsweeps exhibit a non-coherent randomness relative to one another.

It is this non-coherent randomness that permits the inversion process to separate the signals. Furthermore, such dithering can be used to help mitigate artifacts arising from harmonics of the subsweeps. Where multiple sources are used, e.g., in an ISS© acquisition, the subsweeps of each swept composite signal are non-coherently random with respect to each other just as the swept composite signals of the respective sources are non-coherently random with respect to each other. Once again, randomness is not the only method of separating the signals. Other methods of creating non-coherent signals are also possible.

This processing technique more particularly performs an inversion-type method to separate seismic recordings that contain multiple seismic sources that contain overlapping reflection signals. Multiple marine vibratory sources, and the subsweeps comprising each composite swept seismic signal, are initiated at random times relative to one another while multiple receivers are being recorded as described above. These random delays tend to make the interference between different sources incoherent while the reflections associated with the same source create coherent events. The separation may be done with a numerical inversion process that utilizes the sweeps for each shot, the start times of each s hot, and the coherence of reflection events between nearby shots. This method has the potential to allow seismic surveys to be acquired faster and cheaper than has been heretofore possible. Additional detail on the processing may be found in the patent documents cited above.

As mentioned above, some embodiments may randomize gaps rather than overlaps in frequency. FIG. 25-FIG. 30 illustrate one example of this type of embodiment. In this particular embodiment, the gaps are randomized in space, but in some other embodiments they may also be randomized in time. In some embodiments they may be randomized in both time and space.

Figure 26:
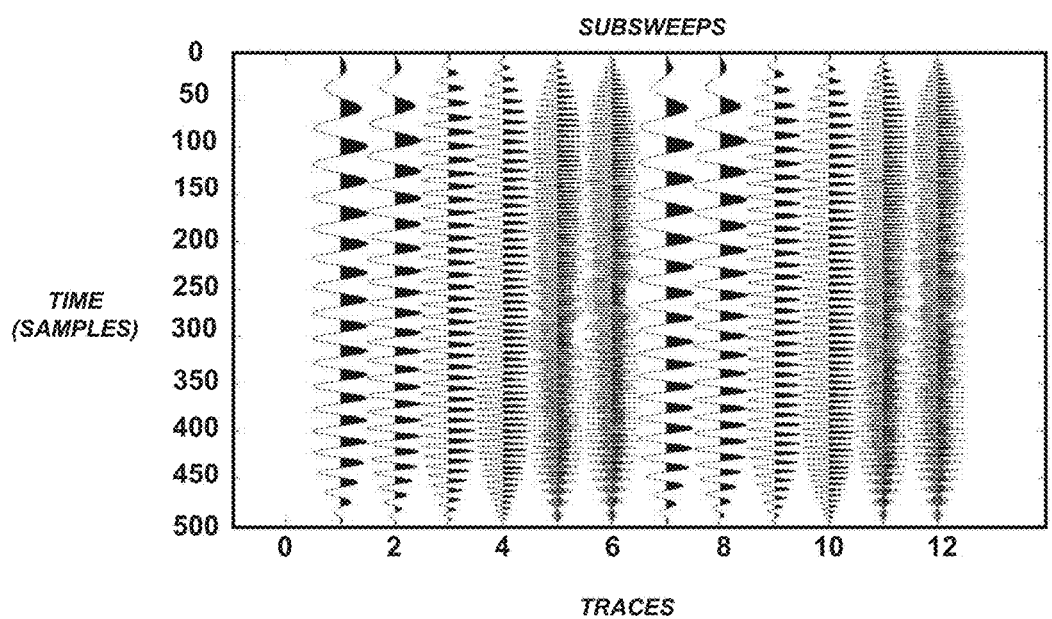
Figure 27:
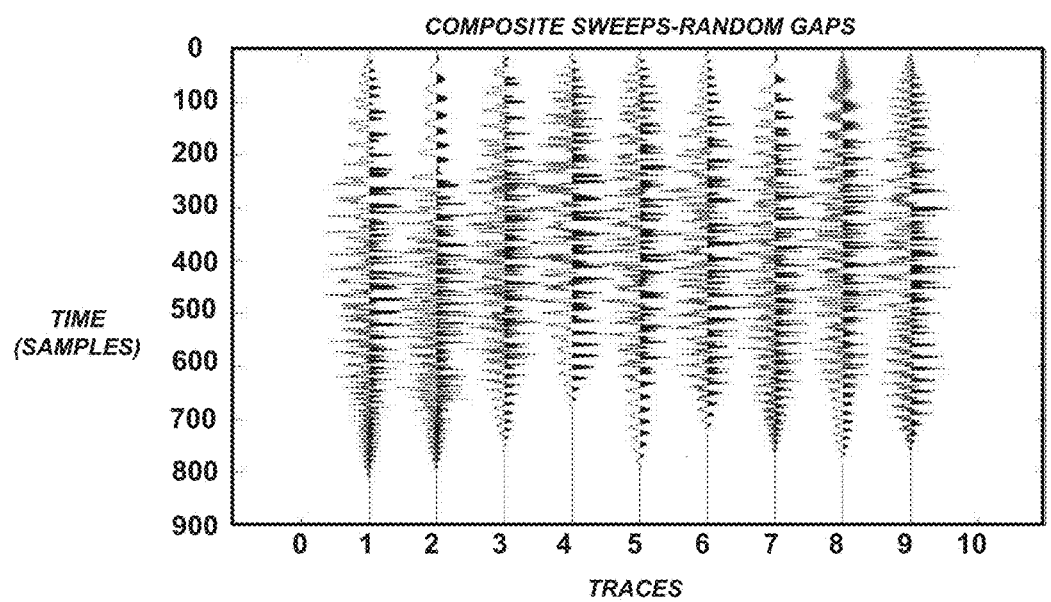

FIG. 26-FIG. 31 illustrate an alternative embodiment in which a plurality of subsweeps, together, produce the full spectrum of the desired composite swept signal in this particular embodiment. The subsweeps are shown in FIG. 26 and, in this case, there are gaps in the frequencies of the subsweeps. The subsweeps in FIG. 26 are combined to create the composite swept signals seen in FIG. 27 that, if correlated, would create imaging artifacts, but different artifacts for each composite swept signal. Since the artifacts are not as coherent as the signal is expected to be, an inversion process that uses the coherence of the signal may be used to extract the desired signal. The existence of gaps in the spectra allow for methods of processing the data that do not require the inversion process. For example the sweeps may now be correlated without creating artifacts from the common frequencies in the source signals, although the results would need to be corrected for gaps in the spectra.

Figure 28:
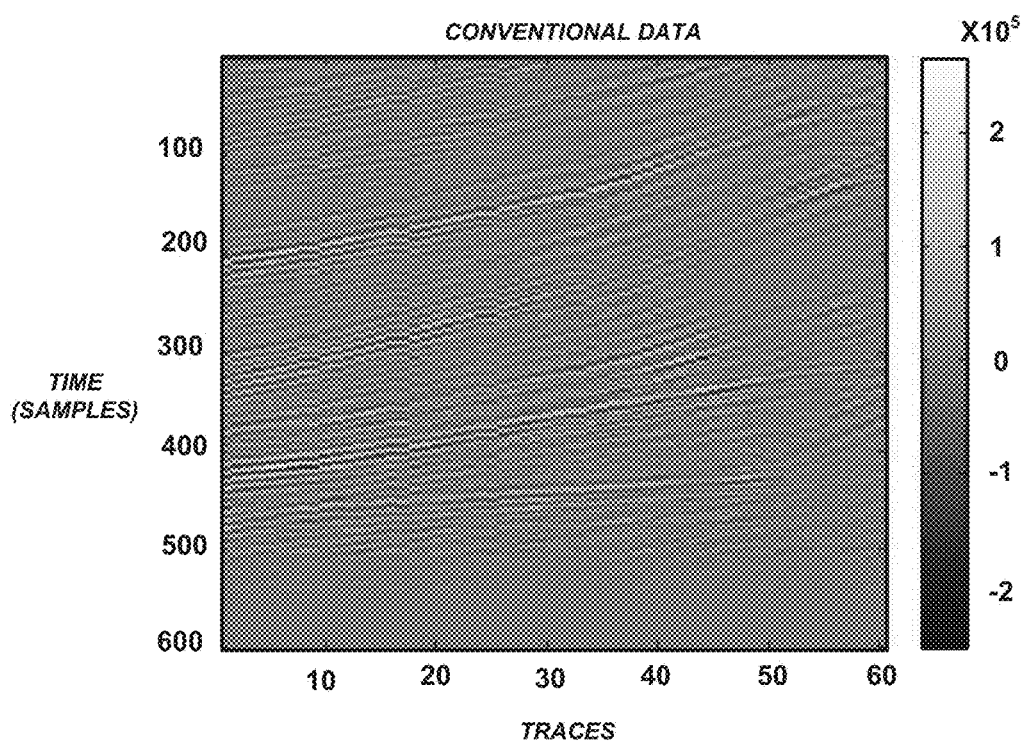
Figure 29:
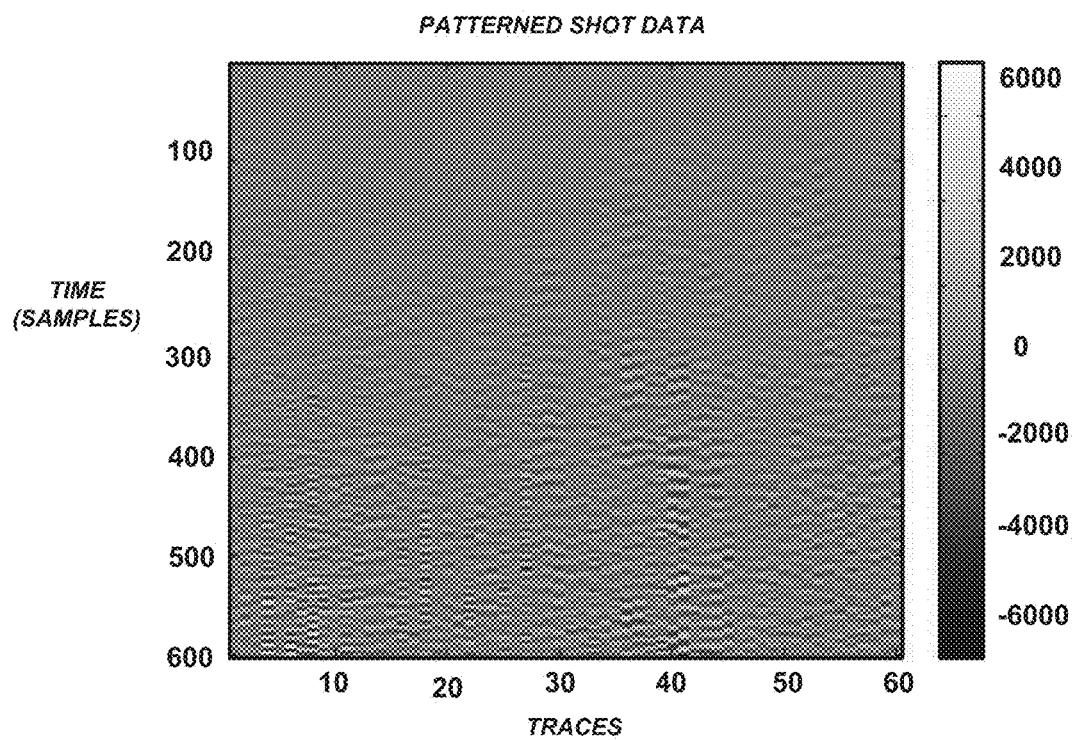
Figure 30:
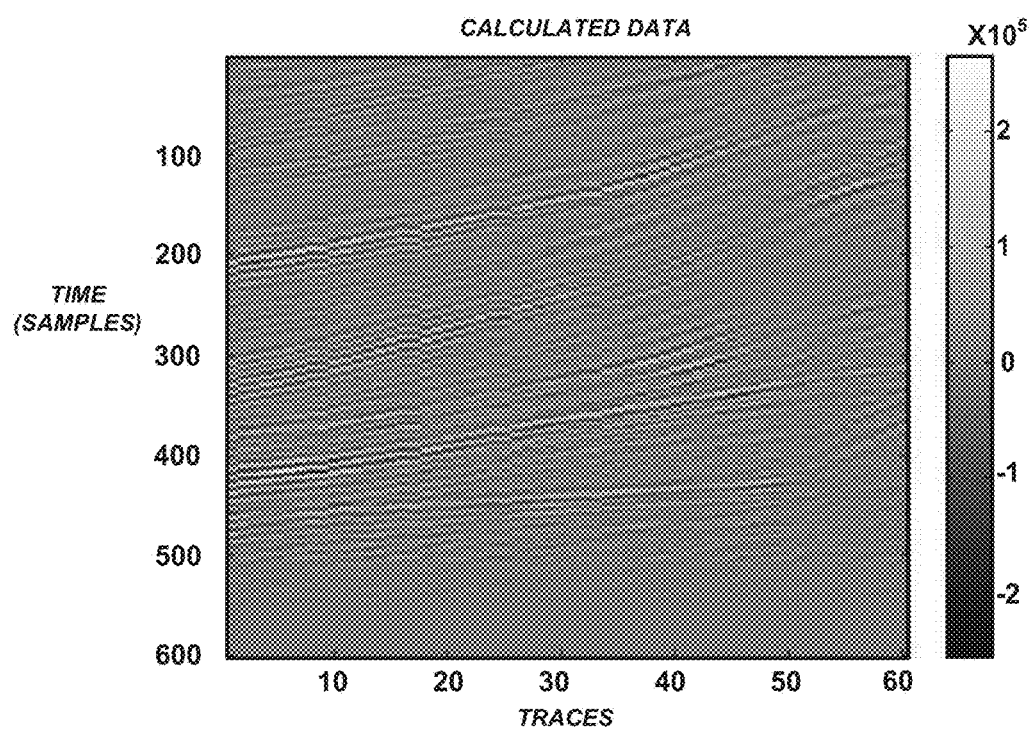
Figure 31:
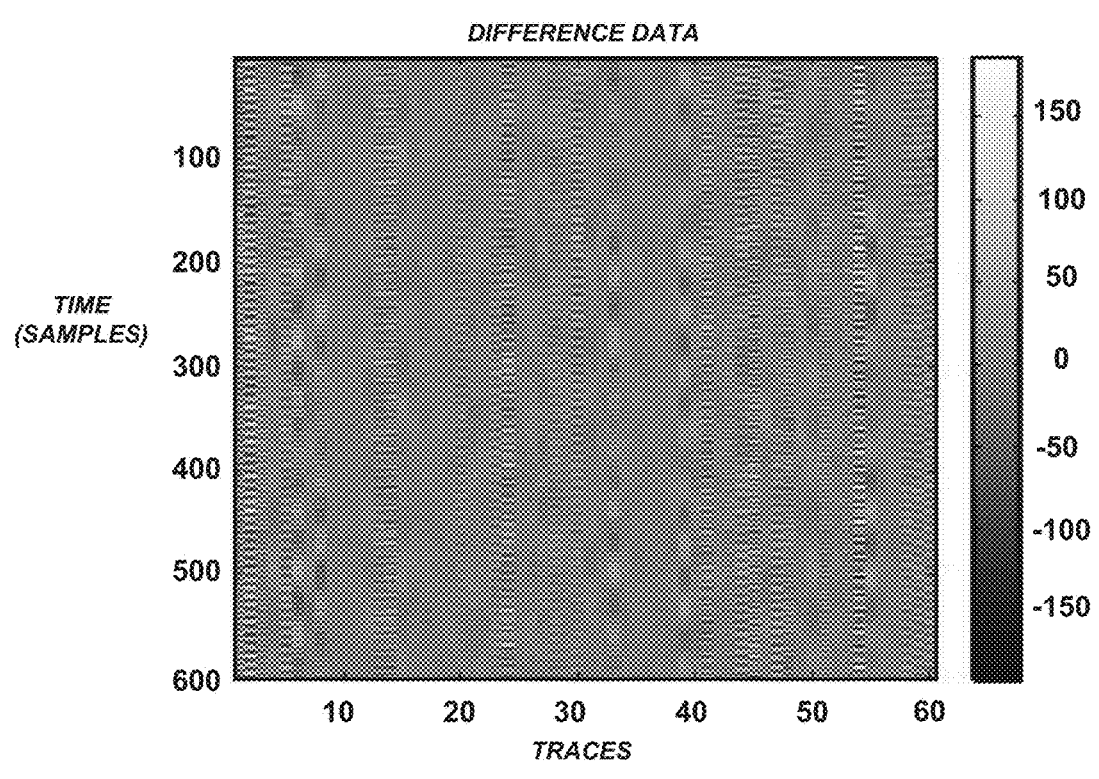

FIG. 28 shows the signal derived from a conventional impulsive source. FIG. 29 shows the result of using the sweeps in FIG. 27 randomly along the source line. FIG. 30 shows the result of using an inversion to reconstruct the conventional data from the data acquired with composite swept signals. Those in the art having the benefit of this disclosure will appreciate that the reconstruction is very accurate. The difference between the conventional results and the reconstructed results are show in FIG. 31. The difference is about 90 dB below the conventional signal amplitudes and are essentially zero.

Other embodiments of the invention will be apparent to those skilled in the art from consideration of the specification and practice of the invention disclosed herein.

What is claimed is:

1. A method, comprising:
   towing at least a portion of a seismic survey spread;
   imparting, by one or more marine seismic sources of the seismic survey spread, a composite swept seismic signal including a plurality of randomized subsweeps having different frequencies relative to one another and being emitted in parallel, the plurality of randomized subsweeps comprising subsweeps that are imparted at low frequencies and subsweeps that are imparted at low frequencies being greater than a source interval for subsweeps that are imparted at higher frequencies, the source interval being a period of time between triggering one or more of the marine seismic sources; and
   receiving a respective return for each of the subsweeps.

2. The method of claim 1, wherein towing the marine seismic survey spread includes towing the marine seismic survey spread along a predetermined path.

3. The method of claim 1, wherein the subsweeps overlap in frequency and the respective times at which they are imparted are randomized.

4. The method of claim 1, wherein the subsweeps do not overlap in frequency and the frequency gaps between the subsweeps are randomized.

5. The method of claim 4, wherein the frequency gaps are randomized in either space or time.

6. The method of claim 4, wherein the frequency gaps are randomized in both space and time.

7. The method of claim 1, further comprising:
   towing the seismic survey spread to a second position;
   imparting a second composite swept seismic signal from the marine seismic survey spread, the composite swept seismic signal including a second plurality of subsweeps randomized in time having different frequencies relative to one another and being emitted in parallel; and
   receiving a respective return for each of the second plurality of subsweeps.

8. The method of claim 7, wherein the second plurality of subsweeps differs in number from the first plurality of subsweeps.

9. The method of claim 1, further comprising:
   towing the marine seismic survey spread to a second position;
   imparting a second composite swept seismic signal from the spread, the second swept seismic signal including subsweeps randomized in time of the first composite swept seismic signal; and receiving a return for each of the second swept seismic signal.

10. The method of claim 1, further comprising:
towing a second seismic survey spread;
imparting a second composite swept seismic signal from the second spread, the second swept signal including a second plurality of subsweeps of different frequencies emitted in parallel, the first and second composite swept seismic signals being imparted with relative non-coherent random timing; and
receiving a respective return for each of the second plurality of subsweeps.

11. A method, comprising:
towing a marine seismic survey spread, the marine seismic survey spread including:
a marine vibratory source comprised of an array of marine vibrators; and
a plurality of marine seismic receivers; and
imparting a composite swept seismic signal from the spread, including:
imparting a first subsweep of the composite swept seismic signal at a low frequency from a first portion of the marine vibrators during a first source interval, the first source interval being a period of time between triggering the first portion of the marine vibrators; and
imparting a second subsweep of the composite swept seismic signal from a second portion of the marine vibrators at a higher frequency during a second source interval, the second source interval being a period of time between triggering the second portion of the marine vibrators,
the first source interval for the first subsweep imparted at the low frequency being greater than the second source interval for the second subsweep imparted at the higher frequency.

12. The method of claim 11, wherein the first and second subsweeps overlap in frequency and the respective times at which they are imparted are randomized.

13. The method of claim 11, wherein the first and second subsweeps do not overlap in frequency and the frequency gaps between the subsweeps are randomized.

14. The method of claim 11, wherein at least one of the first and second portions of the marine vibrators is clustered within the array.

15. The method of claim 11, wherein at least one of the first and second portions of the marine vibrators is distributed across the array.

16. The method of claim 11, wherein the first and second portions are selected from within the array based on the characteristics of the subsweeps.

17. An apparatus, comprising:
a marine seismic survey vibratory source including an array comprised of a plurality of vibrators; and
a computing apparatus programmed to initiate the plurality of vibrators at a plurality of predetermined shot points to impart a composite swept seismic signal, the composite swept signal including a plurality of randomized subsweeps having different frequencies relative to one another and being emitted in parallel, the plurality of randomized subsweeps comprising subsweeps that are imparted at low frequencies and subsweeps that are imparted at higher frequencies, a source interval for subsweeps that are imparted at low frequencies being greater than a source interval for subsweeps that are imparted at higher frequencies, the source interval being a period of time between triggering one or more of the vibrators at each of the predetermined shot points.

18. The apparatus of claim 17, wherein:
the marine seismic survey vibratory source comprises of an array of marine vibrators; and
imparting a composite swept seismic signal includes:
imparting a first subsweep from a first portion of the marine vibrators; and
imparting a second subsweep from a second portion of the marine vibrators in parallel with the first subsweep; and
at least one of the first and second portions of the marine vibrators is clustered within the array.

19. The apparatus of claim 17, wherein:
the marine seismic survey vibratory source comprises of an array of marine vibrators; and
imparting a composite swept seismic signal includes:
imparting a first subsweep from a first portion of the marine vibrators; and
imparting a second subsweep from a second portion of the marine vibrators in parallel with the first subsweep; and
at least one of the first and second portions of the marine vibrators is distributed across the array.

20. The apparatus of claim 17, wherein:
the marine seismic survey vibratory source comprises of an array of marine vibrators; and
imparting a composite swept seismic signal includes:
imparting a first subsweep from a first portion of the marine vibrators; and
imparting a second subsweep from a second portion of the marine vibrators in parallel with the first subsweep; and
the first and second portions are selected from within the array based on the characteristics of the subsweeps.

* * * * *